United States Patent
Fukushima et al.

(10) Patent No.: US 11,313,576 B2
(45) Date of Patent: Apr. 26, 2022

(54) AIR-CONDITIONER COMMUNICATION SYSTEM, METHOD OF CONFIRMING CONNECTION OF AIR-CONDITIONER COMMUNICATION SYSTEM, WIRELESS LAN ADAPTER, AND CONNECTION CONFIRMATION INSTRUCTIONS OF AIR-CONDITIONER COMMUNICATION SYSTEM

(71) Applicant: DAIKIN INDUSTRIES, LTD., Osaka (JP)

(72) Inventors: Wataru Fukushima, Osaka (JP); Kazuhiro Akita, Osaka (JP); Kunitaka Morimoto, Osaka (JP); Yuuki Ogiso, Osaka (JP); Yuu Ohhashi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/262,604

(22) PCT Filed: Jun. 25, 2019

(86) PCT No.: PCT/JP2019/025151
§ 371 (c)(1),
(2) Date: Jan. 22, 2021

(87) PCT Pub. No.: WO2020/031528
PCT Pub. Date: Feb. 13, 2020

(65) Prior Publication Data
US 2021/0262685 A1    Aug. 26, 2021

(30) Foreign Application Priority Data

Aug. 9, 2018   (JP) .............................. JP2018-150170

(51) Int. Cl.
*F24F 11/58* (2018.01)
*F24F 11/52* (2018.01)
*H04W 84/12* (2009.01)

(52) U.S. Cl.
CPC .............. *F24F 11/58* (2018.01); *F24F 11/52* (2018.01); *H04W 84/12* (2013.01)

(58) Field of Classification Search
CPC ........... F24F 11/58; F24F 11/52; H04W 84/12
See application file for complete search history.

(56) References Cited

U.S. PATENT DOCUMENTS

2006/0293770 A1   12/2006   Masunaga
2013/0173811 A1   7/2013    Ha et al.
(Continued)

FOREIGN PATENT DOCUMENTS

EP    3088810 A1    11/2016
JP    2004297461 A  10/2004
(Continued)

OTHER PUBLICATIONS

Notice of Reasons for Refusal issued in corresponding Japanese Patent Application No. 2018-150170, dated Aug. 6, 2019, with translation (10 pages).
(Continued)

*Primary Examiner* — Ziaul Karim
(74) *Attorney, Agent, or Firm* — Osha Bergman Watanabe & Burton LLP (57) ABSTRACT

An air-conditioner communication system includes: a ceiling-embedded air conditioner; a wireless local area network (LAN) adapter attached to the air conditioner and that functions as a network communication unit of the air conditioner; a router that configures a LAN; a server that communicates with the router via a telecommunication line; and a terminal device that communicates with the wireless
(Continued)

LAN adapter and that includes a display. The wireless LAN adapter is connected to the LAN, acquires connection information that indicates whether the wireless LAN adapter is in communication with the router, and provides the terminal device with the connection information. The terminal device displays indicates, on the display based on the connection information, whether the air conditioner, the wireless LAN adaptor, the router, and the server are in communication with one other.

9 Claims, 8 Drawing Sheets

(56) References Cited

U.S. PATENT DOCUMENTS

| | | | |
|---|---|---|---|
| 2014/0316584 A1* | 10/2014 | Matsuoka | F24F 11/62 |
| | | | 700/278 |
| 2016/0072638 A1 | 3/2016 | Amer et al. | |
| 2016/0373270 A1* | 12/2016 | Yang | G01S 7/4915 |
| 2017/0038087 A1* | 2/2017 | Nabeshima | F24F 1/0003 |
| 2017/0159954 A1 | 6/2017 | Bergman et al. | |
| 2017/0249135 A1* | 8/2017 | Gandhi | H04L 67/14 |

FOREIGN PATENT DOCUMENTS

| | | |
|---|---|---|
| JP | 2014143513 A | 8/2014 |
| JP | 2016116159 A | 6/2016 |
| JP | 2017512396 A | 5/2017 |
| JP | 2017157933 A | 9/2017 |

OTHER PUBLICATIONS

Decision to Grant a Patent issued in corresponding Japanese Patent Application No. 2018-150170, dated Feb. 18, 2020, with translation (7 pages).
International Search Report issued in corresponding International Application No. PCT/JP2019/025151, dated Aug. 13, 2019, with translation (5 pages).
International Preliminary Report on Patentability issued for International Patent Application No. PCT/JP2019/025151, dated Feb. 9, 2021 (9 pages).

* cited by examiner

AIR-CONDITIONER COMMUNICATION SYSTEM, METHOD OF CONFIRMING CONNECTION OF AIR-CONDITIONER COMMUNICATION SYSTEM, WIRELESS LAN ADAPTER, AND CONNECTION CONFIRMATION INSTRUCTIONS OF AIR-CONDITIONER COMMUNICATION SYSTEM

TECHNICAL FIELD

The present invention relates to network communication of an air conditioner.

BACKGROUND

In recent years, driving monitoring systems that remotely monitor status of monitored devices using Internet of Things (IoT) have been considered in various fields, in addition to using personal computers and mobile information terminals connected to Internet (see, for example, Patent Literature 1). One example of such systems is an air conditioning system that remotely monitors an air conditioner. A router of a consumer acquires information from each air conditioner via a local area network in the consumer and transmits the information to a server connected via the Internet. As a result, the server can remotely monitor the air conditioner of the consumer.

PATENT LITERATURE

Patent Literature 1: Japanese Unexamined Patent Publication No. 2004-297461

By connecting a wireless LAN adapter to an air conditioner, for example, the air conditioner can be easily incorporated into the local area network. The wireless LAN adapter can be attached to an indoor unit of the air conditioner by a wired connection, for example. The wireless LAN adapter and a router are communicable with each other by performing a pairing operation. Pairing can be performed while visually confirming by operating an operation button provided on the wireless LAN adapter and lighting or blinking an LED indicator lamp.

However, depending on an installation environment of the wireless LAN adapter, it may not be easy to see the wireless LAN adapter during or after initial installation of the indoor unit and the wireless LAN adapter. In this case, it is not easy to perform the pairing operation while looking at the wireless LAN adapter.

SUMMARY

One or more embodiments of the present invention provide an easier way to check a network connection status of an air-conditioner communication system without looking at a wireless LAN adapter.

(1) An air-conditioner communication system of one or more embodiments of the present invention includes an air conditioner, a wireless LAN adapter attached to the air conditioner and having a function as a network communication unit of the air conditioner, a router configuring a local area network with the wireless LAN adapter, a server communicable with the router via a telecommunication line, and a terminal device communicable with the wireless LAN adapter and having a display, in which the wireless LAN adapter has a function of; acquiring connection information as to whether the wireless LAN adapter is communicable with the router; and providing the terminal device with the connection information.

In the air-conditioner communication system configured as described above, the network connection status can be easily confirmed without looking at the wireless LAN adapter. The terminal device is a setting tool such as a personal computer, or a remote controller connected to the air conditioner.

(2) In the air-conditioner communication system of (1), the terminal device may have a function of receiving an operation on the wireless LAN adapter and transmitting an operation signal to the wireless LAN adapter.

In this case, even in the installation environment where it is not easy to directly operate the wireless LAN adapter, necessary operations can be performed on the display of the terminal device. Therefore, for example, even if the wireless LAN adapter is installed in a place such as behind the ceiling where it is difficult to operate the wireless LAN adapter after installation, the necessary operation can be performed on the display of the terminal device.

(3) In the air-conditioner communication system of (1) or (2), the terminal device displays as the connection information on the display whether the air conditioner, the wireless LAN adapter, the router, and the server are communicable with each other, for example.

In this case, the network connection status between the four devices can be easily confirmed on the display of the terminal device, which can be useful for factor analysis when the network communication is not normally performed.

(4) In the air-conditioner communication system of any of (1) to (3), for example, the connection information is acquired periodically or by an update operation.

The connection information, which does not change frequently by nature, can be obtained sufficiently as needed by updating periodically at intervals or by the update operation.

(5) In the air-conditioner communication system of any of (1) to (4), the wireless LAN adapter transmits a signal (i.e., response request signal) requesting a response to the server, and the wireless LAN adapter, the router, and the server may be determined to be connected to each other based on a reception of a response to the signal.

In this case, the terminal device can display whether the wireless LAN adapter, the router, and the server are connected by simply communicating with the wireless LAN adapter.

(6) In the air-conditioner communication system of any of (1) to (5), the terminal device may have a function of initializing a connection between the wireless LAN adapter and the router on a screen displayed on the display.

In this case, the initialization operation can be performed without directly touching the wireless LAN adapter.

(7) In the air-conditioner communication system of any of (1) to (6), an identical screen as the connection information displayed on the display may include a screen for setting the connection between the wireless LAN adapter and the router.

In this case, the operator of the terminal device can confirm the network connection status on one screen, set the connection between the wireless LAN adapter and the router if necessary, and confirm the network connection status after the connection setting.

(8) A method of confirming a connection of an air-conditioner communication system of one or more embodiments of the present invention is provided. The connection is confirmed between a wireless LAN adapter, which has a function as a network communication unit of an air conditioner, and a terminal device that communicates with the wireless LAN adapter and that has a display. The method includes accessing the wireless LAN adapter from the terminal device, acquiring connection information, as to whether the wireless LAN adapter is communicable with a router that is to configure a local area network, from the wireless LAN adapter, and displaying the connection information on the display.

In the method of confirming the connection of the air-conditioner communication system as described above, the network connection status can be easily confirmed without looking at the wireless LAN adapter.

(9) A wireless LAN adapter that has a function as a network communication unit of an air conditioner and that is communicable with a terminal device is provided. The wireless LAN adapter includes: a connection information acquisition unit configured to acquire connection information as to whether the wireless LAN adapter is communicable with a router that is to configure a local area network and; a display image construction unit that uses the connection information as display image data.

In the above wireless LAN adapter, the network connection status can be easily confirmed by accessing the wireless LAN adapter from the terminal device and viewing and displaying the network connection status without looking at the wireless LAN adapter.

(10) Connection confirmation instructions of an air-conditioner communication system of one or more embodiments of the present invention are provided. The connection confirmation instructions are installed in a terminal device. The terminal device is communicable with a wireless LAN adapter, which has a function as a network communication unit of an air conditioner, and has a display. The connection confirmation instructions allow the terminal device to achieve a function of accessing the wireless LAN adapter and acquiring connection information as to whether the wireless LAN adapter is communicable with a router that is to configure a local area network, and a function of displaying the connection information on the display.

In the above connection confirmation instructions of the air-conditioner communication system, by installing the instructions in the terminal device, the network connection status can be easily confirmed without looking at the wireless LAN adapter.

DETAILED DESCRIPTION

Configuration Example of Air-Conditioner Communication System: First Embodiment

Figure 1:
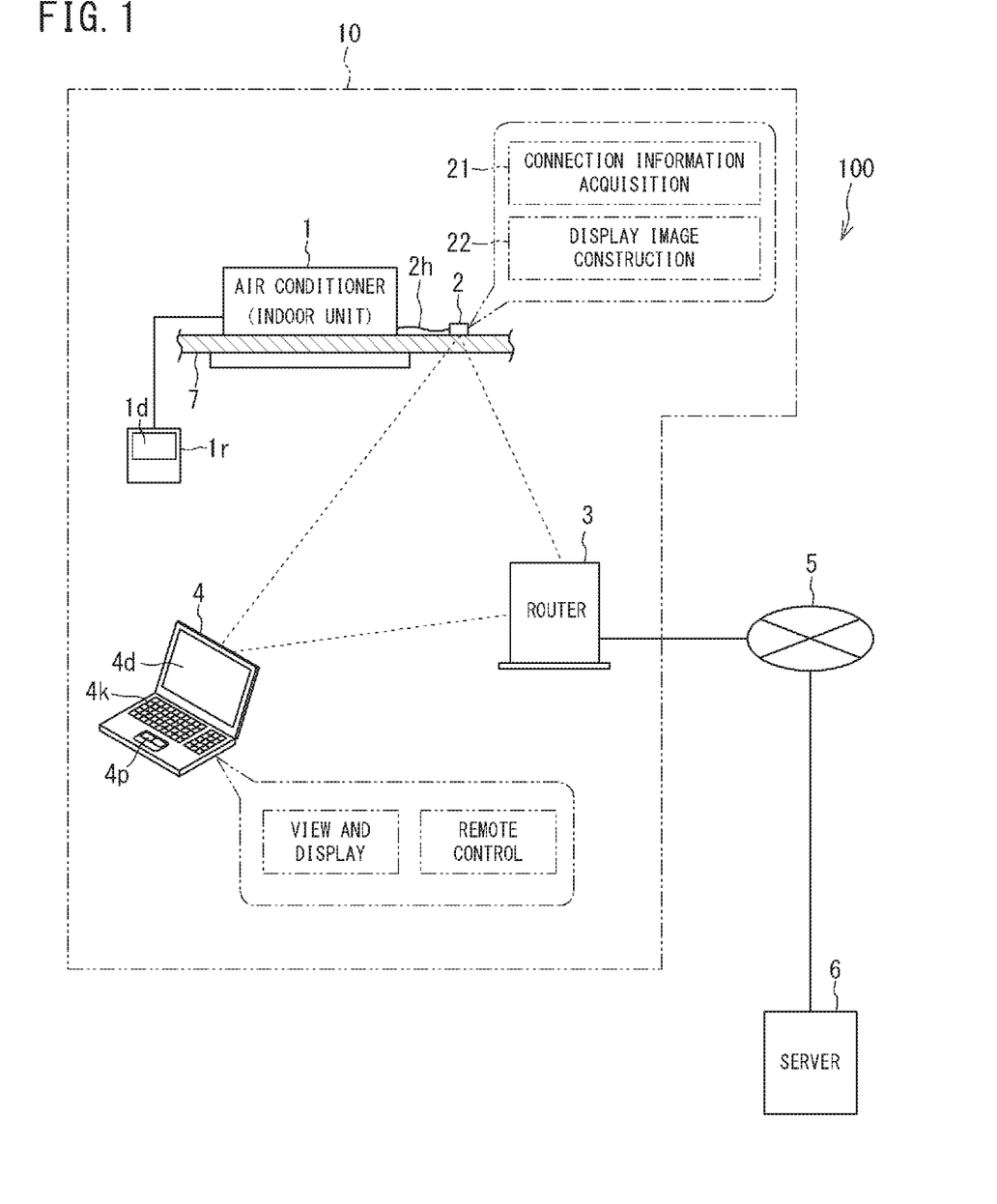
FIG. 1 is a connection diagram showing a first embodiment of an air-conditioner communication system.

FIG. 1 is a connection diagram showing a first embodiment of an air conditioner communication system 100. In FIG. 1, first, as devices at a consumer 10 of an air conditioner, the air-conditioner communication system 100 includes an air conditioner (indoor unit) 1, a remote controller 1r, a wireless LAN adapter 2, a router 3 provided with a wireless LAN function, and a terminal device 4 mainly as a setting tool. The router 3 configures a local area network (LAN) with various network devices (not shown) within the consumer 10 in addition to the wireless LAN adapter 2 and the terminal device 4. The terminal device 4 is, for example, a personal computer, a tablet computer, a mobile phone, or the like provided with a wireless LAN function. Thus, the terminal device 4 is wirelessly communicable with the wireless LAN adapter 2 and the router 3. The remote controller 1r is connected to the air conditioner 1 and has various operations and various setting functions in addition to act as a display 1d. The remote controller 1r and the air conditioner 1 can be connected either by wire or wirelessly.

Further, a server 6 is connected to outside of the consumer 10 via Internet 5 as a telecommunication line. The server 6 is a device installed at an air conditioning service provider that remotely monitors the air conditioner 1. The server 6 is communicable with the router 3 via the Internet 5.

The air conditioner 1 shown in FIG. 1 is a type of air conditioner embedded in a ceiling 7. The wireless LAN adapter 2 is installed near the air conditioner 1 and is connected to a circuit board (not shown) in the air conditioner 1 via a harness 2h. The air conditioner 1 is embedded in the ceiling, and thus the wireless LAN adapter 2 is installed behind the ceiling. The wireless LAN adapter 2 connected to the air conditioner 1 has a function as a network communication unit of the air conditioner 1.

Figure 2:
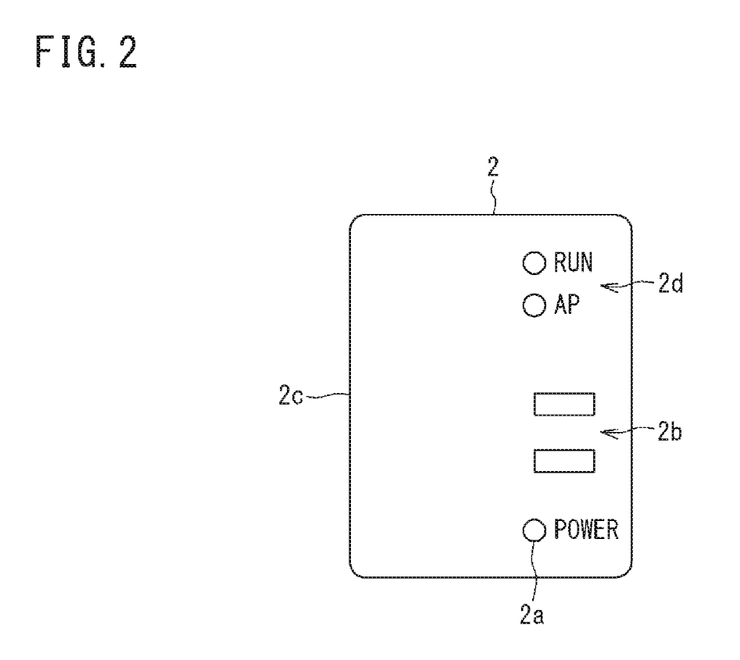
FIG. 2 is an example of a front view of a wireless LAN adapter (except a harness).

FIG. 2 is an example of a front view of the wireless LAN adapter 2 (except the harness 2h). The wireless LAN adapter 2 is, for example, about a size of a palm and is housed in a resin case 2c. For example, an LED power lamp 2a, an operation button 2b, and an LED indicator lamp 2d are disposed on a front surface. The power lamp 2a lights up when a control power supply voltage is applied by connecting to the air conditioner 1.

During an initial installation of the wireless LAN adapter 2, a contractor operates the operation button 2b as appropriate to establish a network connection with the router 3, and checks the network connection status by lighting or blinking of the indicator lamp 2d. Once the wireless LAN adapter 2 is installed, it is not easy to check or operate the indicator lamp of the wireless LAN adapter 2 behind the ceiling unless a special ceiling structure such as an inspection port is provided.

However, after that, for example, some trouble may occur in the network connection including the wireless LAN adapter 2, and the network connection may be reset. In a personal computer or the like, the unestablished network connection would be immediately recognized. However, whether the wireless LAN adapter 2 and the router 3 are paired and communicable with each other cannot be easily recognized when the wireless LAN adapter 2 cannot be seen.

Therefore, the terminal device 4 is used as a "display unit" and an "operation unit" of the wireless LAN adapter 2.

In FIG. 1 again, the wireless LAN adapter 2 is provided with a CPU, memory (ROM or RAM), communication interface, and the like, and achieves necessary functions by executing instructions (software) stored in the memory. For example, the wireless LAN adapter 2 has a function as a wireless LAN access point in addition to a communication function with the air conditioner 1 via the harness 2h, and can perform network communication in the LAN. In addition, the wireless LAN adapter 2 has a "connection information acquisition" function of acquiring information on a communicable opposite party (connection information acquisition unit 21) and a "display image construction" function of displaying the acquired connection information as a screen (display image construction unit 22).

The wireless LAN adapter 2 accesses the router 3 by making full use of the wireless LAN functions. Then, the connection information of whether the wireless LAN adapter 2 is communicable (or paired) with the router 3 is acquired. Further, if the wireless LAN adapter 2 is communicable with the router 3, the connection information of the network that is higher-level than the router 3 as seen from the wireless LAN adapter 2 can also be acquired.

The wireless LAN adapter 2 configures display image data based on the acquired connection information. The wireless LAN adapter 2 itself does not have a display and cannot display. For example, with an access from the terminal device 4, the display image data held by the wireless LAN adapter 2 can be viewed and displayed on a display 4d.

As is well known, the terminal device 4 is equipped with, for example, a hard disk drive (HDD) as an auxiliary storage in addition to the CPU and memory (ROM or RAM), and the CPU executes instructions (software) stored in the memory and HDD to achieve required functions. Further, the terminal device 4 includes the display 4d. For example, as functions related to the wireless LAN adapter 2, the terminal device has a "viewing display" function of viewing and displaying data held by the wireless LAN adapter 2, and a remote operation function using a keyboard 4k or a pointing device 4p.

Thus, the user can recognize whether the wireless LAN adapter 2 is communicable with the router 3, which is minimum required information. As a result, even if the wireless LAN adapter 2 is installed behind the ceiling, the network connection status can be easily confirmed on the display 4d of the terminal device 4. A location behind the ceiling is a typical example, and the same applies when the wireless LAN adapter 2 is installed in a place where it is difficult to visually check the indicator lamp 2d (FIG. 2) after installation.

Furthermore, as a remote operation function, it is possible to receive operations on the wireless LAN adapter 2 from the keyboard 4k or the pointing device 4p and transmit an operation signal to the wireless LAN adapter 2. As a result, even if the wireless LAN adapter 2 is installed behind the ceiling, necessary operations can be performed on the display 4d of the terminal device 4. Further, even if the wireless LAN adapter 2 is located so as to be seen but not to be easily operated directly, the necessary operation can be easily performed on the display 4d of the terminal device 4.

Hereinafter, a specific example of the screen on the display 4d will be described.

<<Example of Screen on Display>>

FIG. 3 to FIG. 7 are diagrams each showing an example of the screen displayed on the display 4d according to a situation. By accessing the wireless LAN adapter 2 from the terminal device 4 and accessing the instructions installed in the wireless LAN adapter 2, such a screen is activated, and the data of the display image held by the wireless LAN adapter 2 is viewed and displayed. The instructions can be terminated by clicking "logout" at a top right of the screen.

Figure 3:
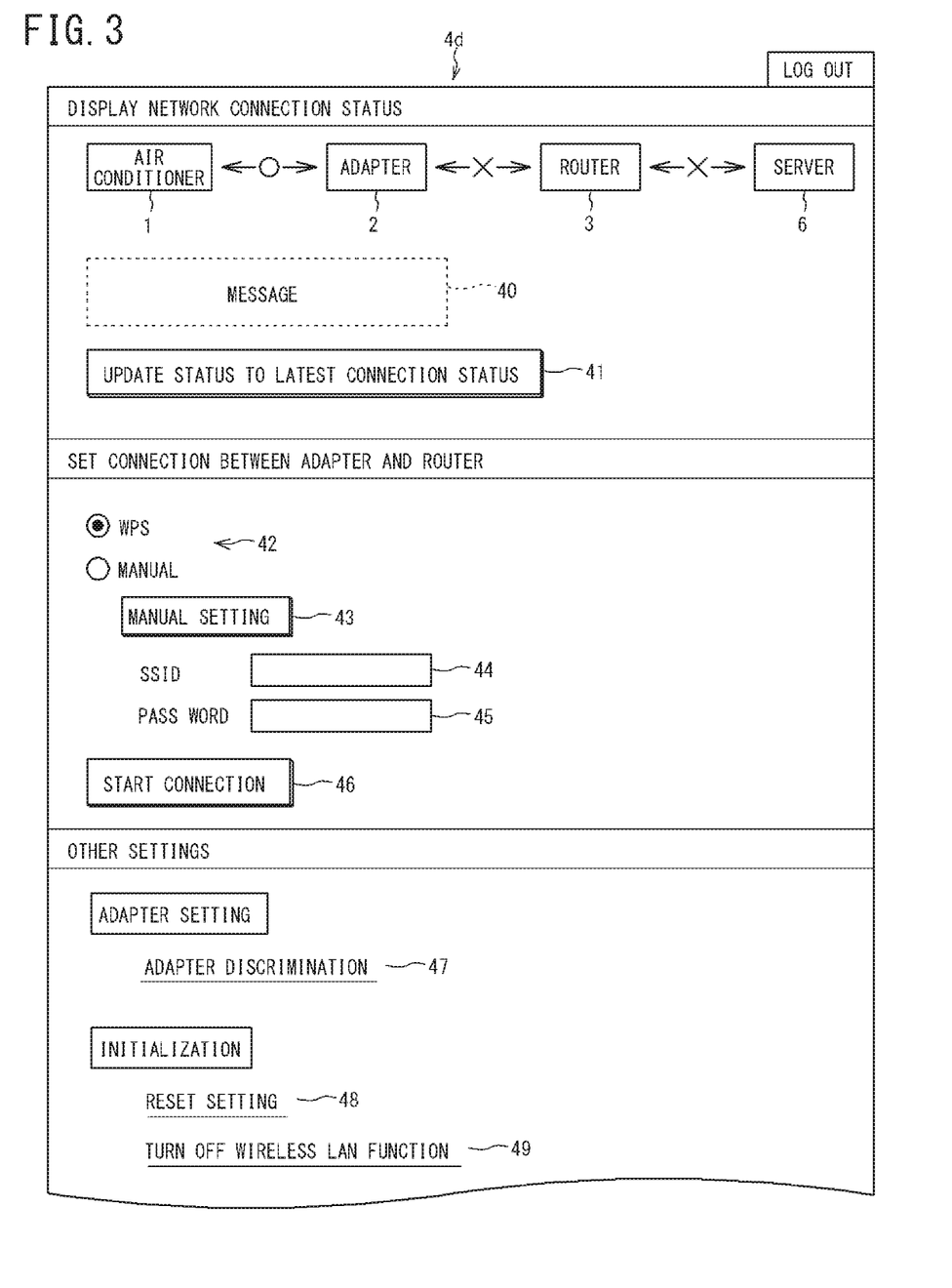
FIG. 3 is an example of a screen displayed on a display, and is a diagram showing, for example, a state in which a network connection is not established between the wireless LAN adapter and a router.

First, FIG. 3 is a diagram showing a state in which, for example, the network connection is not established between the wireless LAN adapter 2 and the router 3. In FIG. 3, the wireless LAN adapter is abbreviated as "adapter". In FIG. 3, a top part of the screen displayed on the display 4d is a screen area of "display network connection status", a middle part of the screen is a screen area of "set connection between adapter and router", and a bottom part of the screen is a screen area of "other settings".

<<Network Connection>>

In the screen area of "display network connection status" at the top part, the iconized air conditioner 1, wireless LAN adapter 2, router 3, and server 6 are displayed side by side in a horizontal row. "Good" (as a mark "○") and "poor" (as a mark "x") between the icons represent states being communicably "connected" and "not connected", respectively.

In this example, the air conditioner 1 and the wireless LAN adapter 2 are connected by the harness 2h and are communicable with each other. The connection is therefore displayed as "good". On the other hand, the network connection is not established between the wireless LAN adapter 2 and the router 3. The connection is therefore displayed as "poor". The server 6 is a higher-level device than the router 3 that cannot communicate with the wireless LAN adapter 2, and the connection is therefore displayed as "poor".

If the air conditioner 1 and the wireless LAN adapter 2 are not connected to each other by the harness 2h or cannot communicate with each other by software, "poor" is displayed between the two. Communication with the air conditioner 1 and communication with the router 3 and the server 6 starting from the wireless LAN adapter 2 are displayed independently of each other.

In this way, the connection information is visually displayed on the display 4d as to whether communication is possible between the air conditioner 1, the wireless LAN adapter 2, the router 3, and the server 6. Therefore, the network connection status between the four devices can be easily confirmed on the display 4d of the terminal device 4, which can be useful for factor analysis when network communication is not normally performed.

In a message field 40, the status of such a network connection is supplementarily expressed in words. When an operator of the terminal device 4 clicks an update button 41 below the message field, the status is updated to the latest connection status. That is, the connection information is not updated in real time, but is updated by an update operation. However, if an update period is set and programmed, the status can be updated periodically. The connection information, which does not change frequently by nature, can be obtained sufficiently as needed by updating periodically at intervals or by the update operation.

Figure 4:
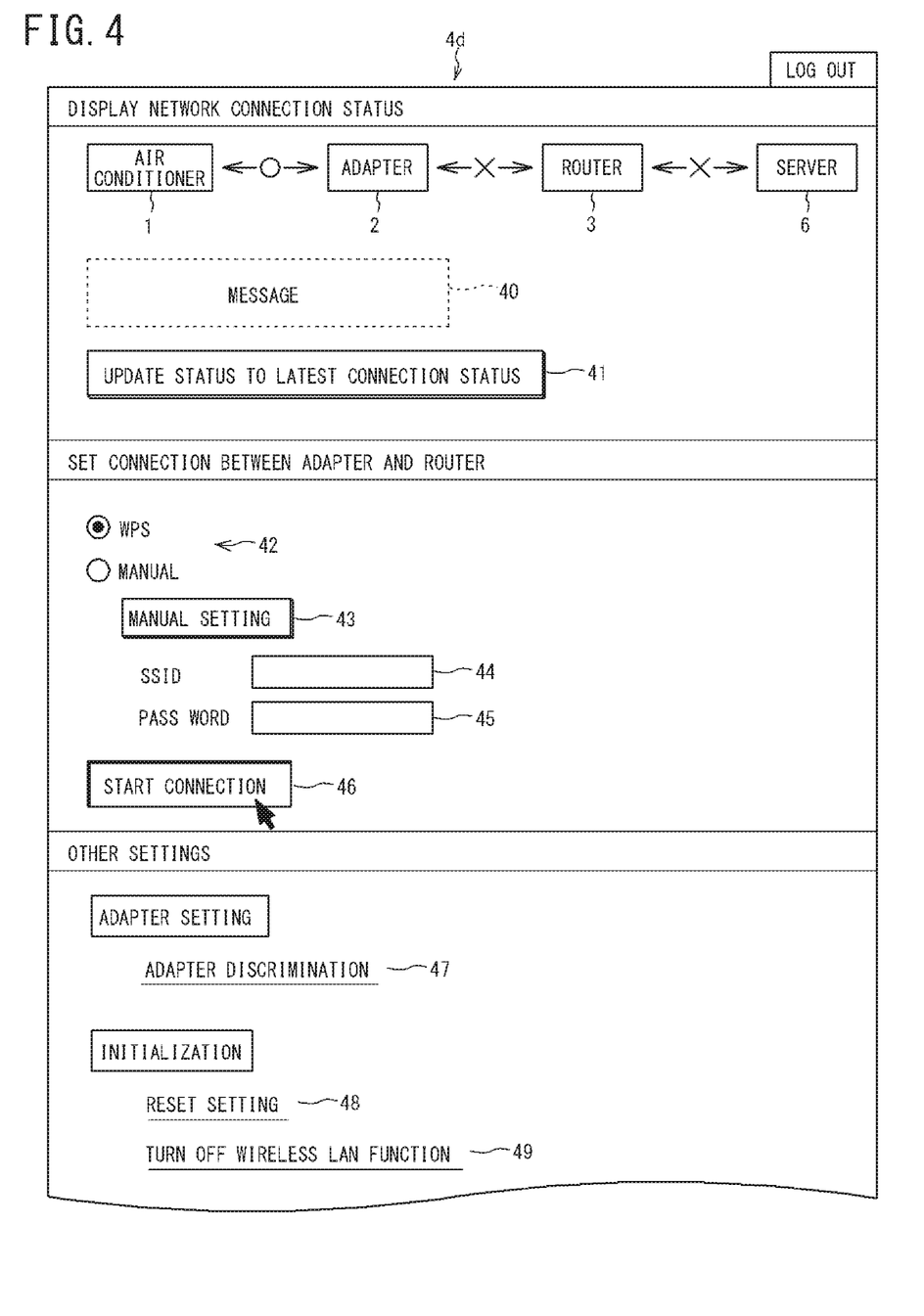
FIG. 4 is an example of the screen displayed on the display, and is a diagram showing a state in which a connection is set between the wireless LAN adapter and the router.

FIG. 4 is a diagram showing a state in which the connection is set between the wireless LAN adapter 2 and the router 3.

The operator can select a Wi-Fi protected setup (WPS) (Wi-Fi and Wi-Fi PROTECTED SETUP are both registered trademarks) or manual setting for automatically searching for the router 3 by selecting the WPS or the manual setting at a selection part 42 in the middle part of the screen. For example, when WPS is selected, the operator clicks a connection start button 46 to connect the wireless LAN adapter 2 and the router 3 to the network and enable communication with each other.

Figure 5:
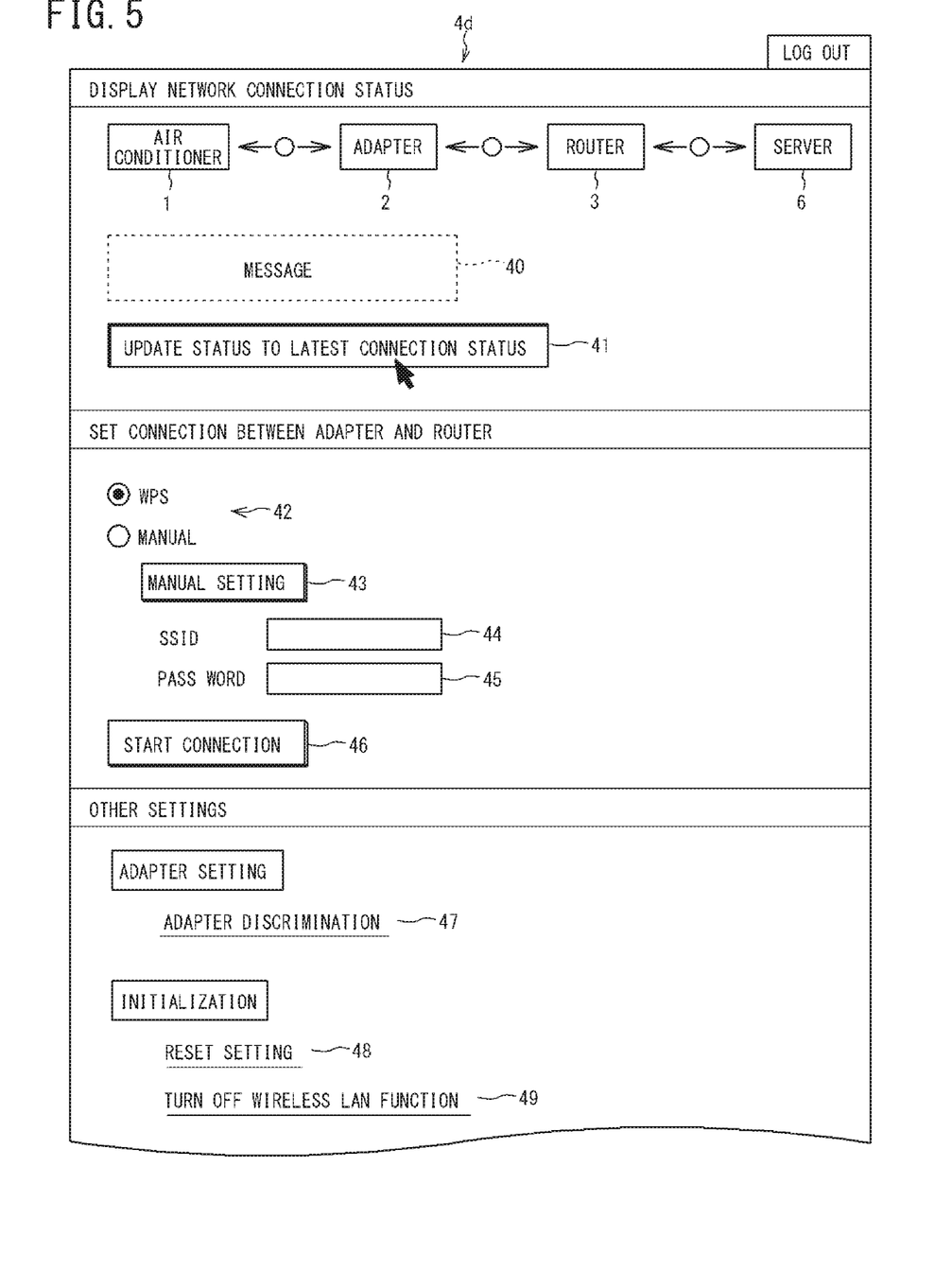
FIG. 5 is an example of the screen displayed on the display, and is a diagram showing what happens when an update button is pressed after the connection setting in FIG. 4.

FIG. 5 is a diagram showing what happens when the update button 41 is subsequently pressed.

Even when the wireless LAN adapter 2 and the router 3 are communicable with each other, the "display network connection status" does not change in real time, and the operator will click the update button 41. As a result, the connection status between the wireless LAN adapter 2 and the router 3 is displayed as "good" indicating as communicable. At this time, if both the router 3 and the server 6 are already communicable with each other, the connection status between the router 3 and the server 6 is displayed as "good". In this state, the network connection from the air conditioner 1 to the server 6 is normal. If the router 3 and the server 6 are not communicable with each other, the connection status between the router 3 and the server 6 is displayed as "poor".

After that, if the network connection status is maintained normally as it is, the display will not change.

To update the status to the latest connection status, the operator is to click the update button 41 or a periodic automatic update is to be programmed. For an update, for example, the wireless LAN adapter 2 transmits a signal requesting a response to the server 6. Then, if a response signal is returned from the server 6, the wireless LAN adapter 2, the router 3, and the server 6 are determined to be connected to each other. In this way, it is possible to display whether the wireless LAN adapter 2, the router 3, and the server 6 are connected by simply transmitting a signal from the wireless LAN adapter 2 to the server 6.

Even if the wireless LAN adapter 2 transmits a signal requesting a response to the server 6 but no reply is received, the connection status between the wireless LAN adapter 2 and the router 3 can be easily determined from the wireless LAN adapter 2. Therefore, if the wireless LAN adapter 2 and the router 3 are connected to each other, it can be determined that the network connection between the router 3 and the server 6 is disconnected.

Figure 6:
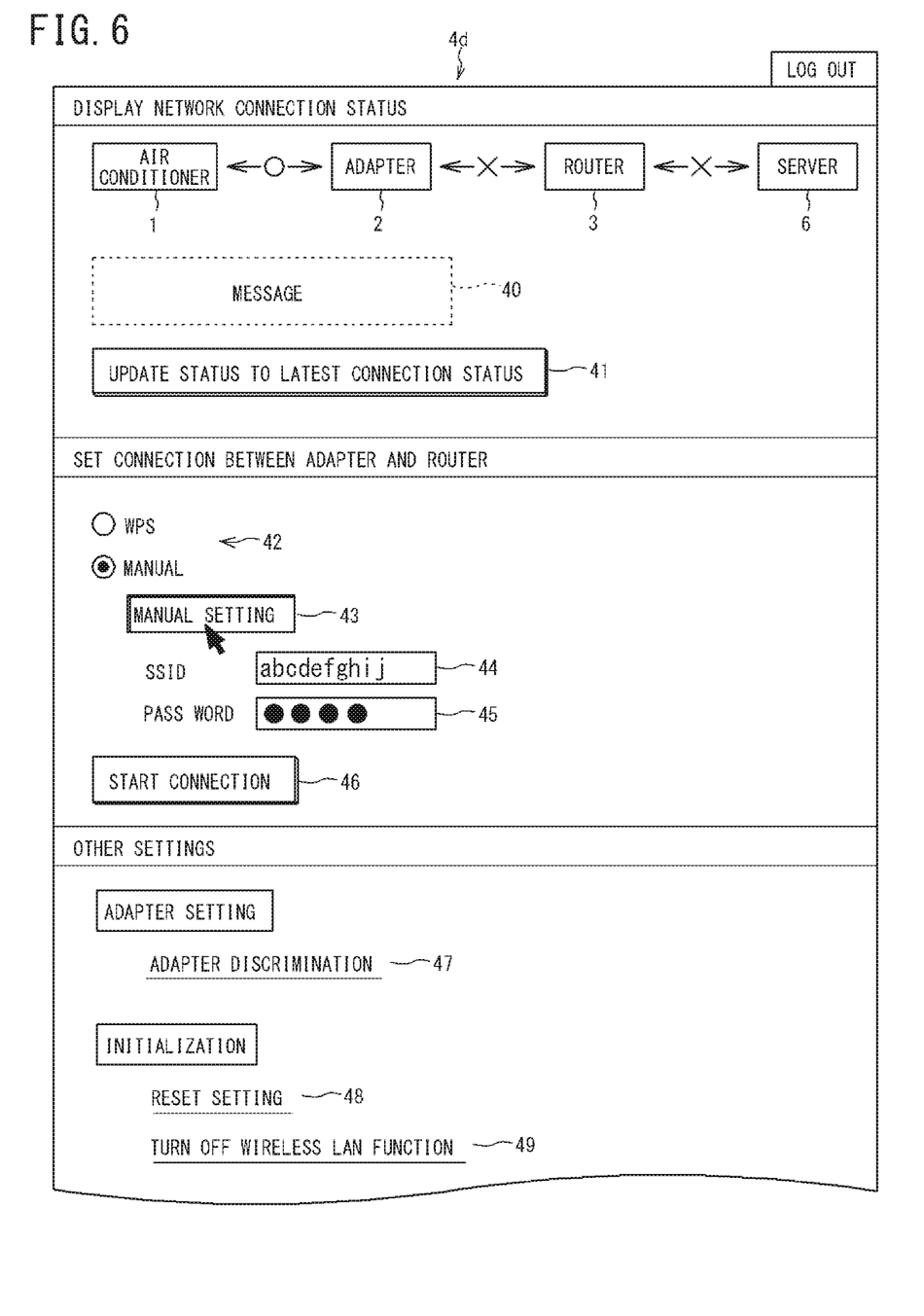
FIG. 6 is an example of the screen displayed on the display, and is a diagram showing a state in which the network connection is not established between the wireless LAN adapter and the router, as in FIG. 3.

Similar to FIG. 3, FIG. 6 is a diagram showing a state in which the network connection is not established between the wireless LAN adapter 2 and the router 3. In this example, the air conditioner 1 and the wireless LAN adapter 2 are connected by the harness 2h and are communicable with each other. The network connection is not established between the wireless LAN adapter 2 and the router 3. The wireless LAN adapter 2 and the router 3 are not connected to each other via the network, and thus the connection status between the router 3 and the server 6 is displayed as "poor".

In this state, a procedure for connecting the wireless LAN adapter 2 and the router 3 to the network by manual setting will be described.

First, the operator switches the selection part 42 to a manual setting at "set connection between adapter and router" in the middle of the screen. Further, the operator clicks a manual setting button 43, and enters a service set identifier (SSID) of the router 3 in an SSID field 44 and a password in a password field 45. Then, the operator clicks the connection start button 46. In this way, the operator can manually connect the wireless LAN adapter 2 and the router 3 to the network from the terminal device 4 without directly touching the wireless LAN adapter 2.

Figure 7:
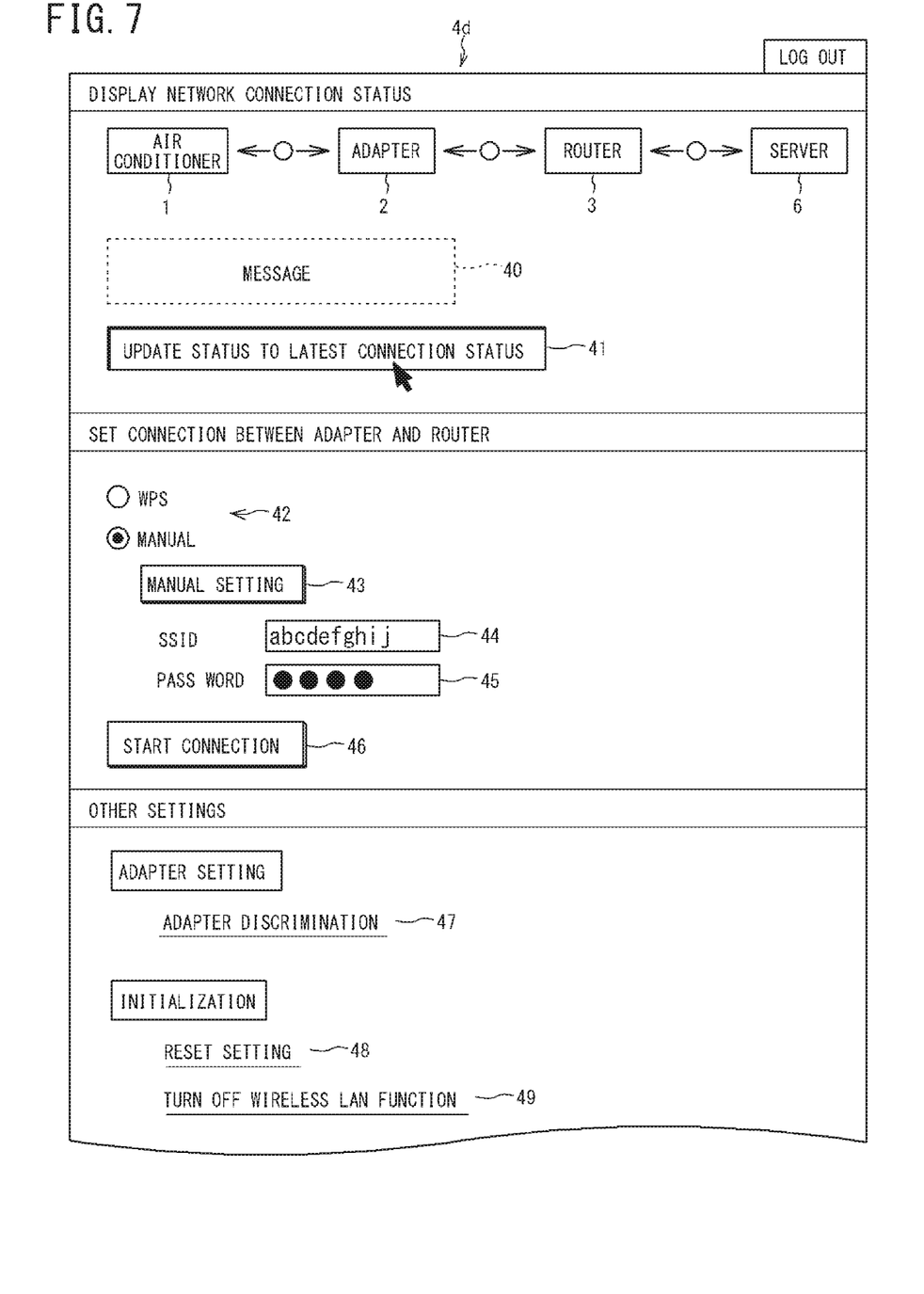
FIG. 7 is an example of the screen displayed on the display, and is a diagram showing a state of manually confirming that the network connection between the wireless LAN adapter and the router is completed.

FIG. 7 is a diagram showing a state of confirming that the manual network connection between the wireless LAN adapter 2 and the router 3 is completed. When the operator clicks the update button 41, the connection status between the wireless LAN adapter 2 and the router 3 is displayed as "good" indicating as communicable. At this time, if both the router 3 and the server 6 are already communicable with each other, the connection status between the router 3 and the server 6 is displayed as "good". In this state, the network connection from the air conditioner 1 to the server 6 is normal.

In this way, it is possible to check the network connection by manual setting on the display 4d until the completion.

As shown in FIGS. 3 to 7, a screen for setting the connection between the wireless LAN adapter 2 and the router 3 ("set connection between adapter and router") is displayed on the same screen as the connection information ("display network connection status") displayed on the display 4d. Therefore, the operator can confirm the network connection status on one screen, set the connection between the wireless LAN adapter 2 and the router 3 if necessary, and confirm the network connection status after the connection setting.

<<Other Settings>>

For example, when the operator clicks a discrimination switch 47 of the wireless LAN adapter 2 in the "other settings" shown at the bottom of the screen in FIGS. 3 to 7, the indicator lamp 2d (FIG. 2) of the wireless LAN adapter 2 blinks. Then, it is possible to confirm the wireless LAN adapter 2 with which the terminal device 4 communicates. However, this is a useful function when there are multiple pairs of the air conditioner 1 and the wireless LAN adapter 2 in the consumer 10, the terminal device 4 is used in common, and the wireless LAN adapter 2 can be seen.

There is also an initialization function for the network connection. For example, clicking a reset switch 48 can reset the connection setting between the wireless LAN adapter 2 and the router 3. As described above, the terminal device 4 has a function of initializing the connection between the wireless LAN adapter 2 and the router 3 on the screen displayed on the display 4d. As a result, the initialization operation can be performed without directly touching the wireless LAN adapter 2. Further, clicking an off switch 49 can turn off the wireless LAN function of the wireless LAN adapter 2.

In the above embodiment, it has been described that the terminal device 4 accesses the wireless LAN adapter 2 and performs "viewing display" and "remote control", but the remote controller 1r can also be equipped with the same function. It can be said that the remote controller 1r in that case is also a form of a "terminal device" in a broad sense.

Configuration Example of Air Conditioner System: Second Embodiment

Figure 8:
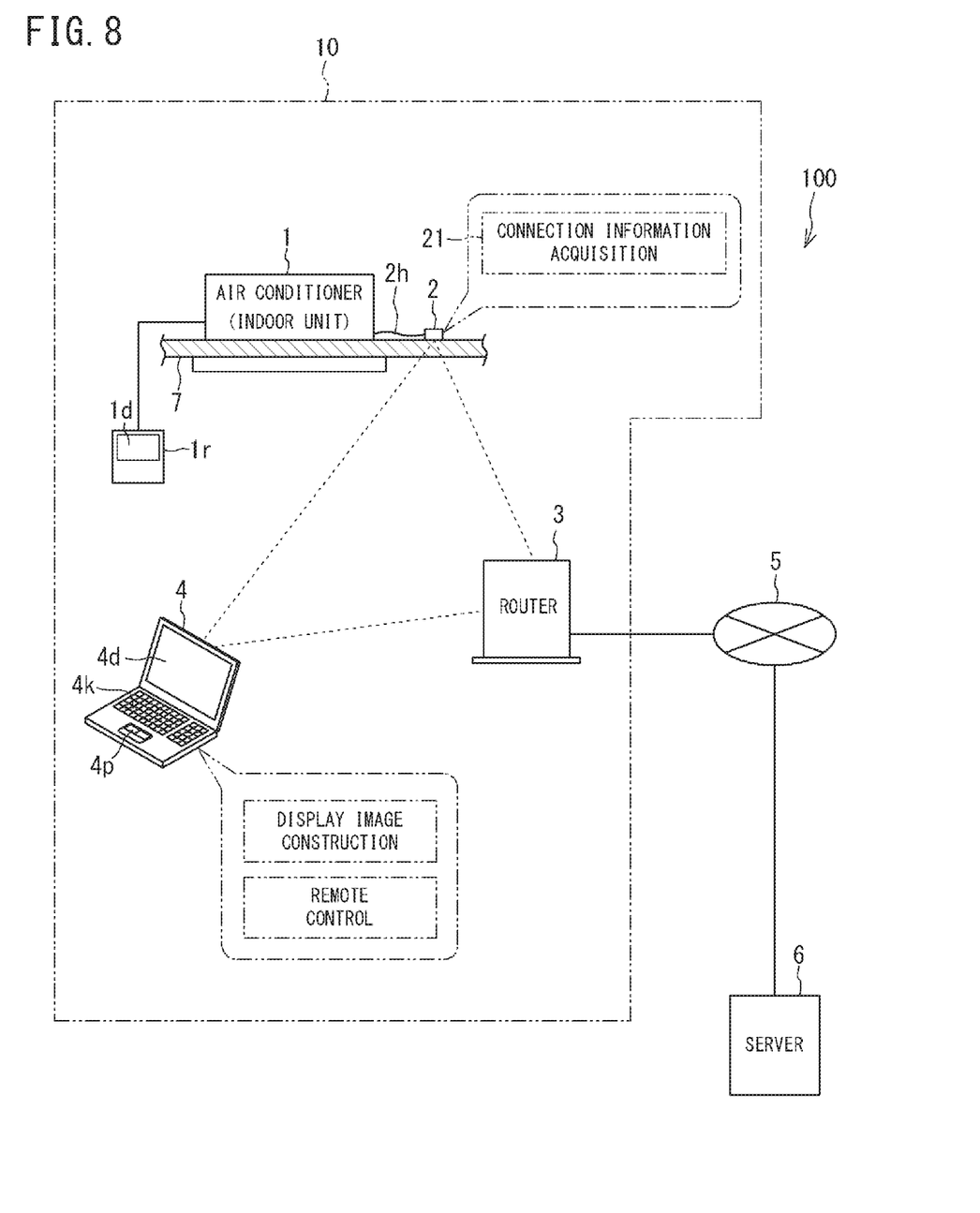
FIG. 8 is a connection diagram showing a second embodiment of the air-conditioner communication system.

FIG. 8 is a connection diagram showing a second embodiment of an air-conditioner communication system 100. A configuration as hardware is the same as in FIG. 1, but attribution of functions achieved by software is slightly different. In FIG. 8, the wireless LAN adapter 2 has a function of acquiring the connection information related to the network, and the function of configuring a display image based on the acquired connection information is a function of the terminal device 4. In this case, an application software for configuring the display image on the terminal device 4 can be installed by downloading from the server 6 or a website, or by attaching flash memory such as USB memory, optical disk, magnetic disk, or another external recording medium to the terminal device 4.

For example, the air-conditioner communication system 100 according to the foregoing embodiments may be summarized and represented as follows. However, the following representations are merely illustrative and not restrictive.

The air-conditioner communication system 100 includes the air conditioner 1, the wireless LAN adapter 2, the router 3, the server 6, and the terminal device 4. The wireless LAN adapter 2 is attached to the air conditioner 1 and has a function as the network communication unit of the air conditioner 1. The router 3 configures the local area network with the wireless LAN adapter 2. The server 6 is communicable with the router 3 via the Internet 5. The terminal device 4 is wirelessly communicable with the wireless LAN adapter 2 and has the display 4*d*. Then, the wireless LAN adapter 2 has a function of acquiring the connection information as to whether the wireless LAN adapter 2 is communicable with the router 3 and providing the terminal device 4 with the connection information. In order to provide the terminal device 4 with the connection information, for example, the wireless LAN adapter 2 may configure the display image and the terminal device 4 may view the display image, or the terminal device 4 may acquire the required connection information from the wireless LAN adapter 2 and the terminal device 4 may configure the display image.

In this air-conditioner communication system 100, the network connection status can be confirmed on the display 4*d* of the terminal device 4 without looking at the wireless LAN adapter 2. Thus, even in an installation environment where it is not easy to visually check the wireless LAN adapter 2, the network connection status can be easily confirmed on the display 4*d* of the terminal device 4.

For example, when the indoor unit is embedded in the ceiling, the wireless LAN adapter 2 is usually disposed behind the ceiling. During the initial installation of the indoor unit and the wireless LAN adapter 2, the contractor can directly operate and visually check the wireless LAN adapter 2 to confirm the network connection status. However, after the installation, it will not be easy to see the wireless LAN adapter 2. Even in such a situation, according to the above air-conditioner communication system 100, the network connection status can be easily confirmed on the display 4*d* of the terminal device 4.

Further, the terminal device 4 can also have a function of receiving the operation on the wireless LAN adapter 2 and transmitting the operation signal to the wireless LAN adapter 2.

In this case, even in the installation environment where it is not easy to directly operate the wireless LAN adapter 2, necessary operations can be performed on the display 4*d* of the terminal device 4. Therefore, for example, even if the wireless LAN adapter 2 is installed in a place such as behind the ceiling where it is difficult to operate the wireless LAN adapter 2 after installation, the necessary operation can be performed on the display 4*d* of the terminal device 4.

The terminal device 4 displays as the connection information on the display 4*d*, for example, whether the air conditioner 1, the wireless LAN adapter 2, the router 3, and the server 6 are communicable with each other.

In this case, the network connection status between the four devices can be easily confirmed on the display 4*d* of the terminal device 4, which can be useful for factor analysis when the network communication is not normally performed.

The connection information may be acquired periodically or by an update operation.

The connection information, which does not change frequently by nature, can be obtained sufficiently as needed by updating periodically at intervals or by the update operation.

As one method of confirming the connection information, the wireless LAN adapter 2 transmits a signal requesting a response to the server 6, and the wireless LAN adapter 2, the router 3, and the server 6 are determined to be connected to each other based on a reception of a response to the signal.

In this case, the terminal device 4 can display whether the wireless LAN adapter 2, the router 3, and the server 6 are connected by simply communicating with the wireless LAN adapter 2.

The terminal device 4 can have a function of initializing the connection between the wireless LAN adapter 2 and the router 3 on the screen displayed on the display 4*d*.

In this case, the initialization operation can be performed without directly touching the wireless LAN adapter 2.

The same screen as the connection information displayed on the display 4*d* may include the screen for setting the connection between the wireless LAN adapter 2 and the router 3.

In this case, the operator of the terminal device 4 can confirm the network connection status on one screen, set the connection between the wireless LAN adapter 2 and the router 3 if necessary, and confirm the network connection status after the connection setting.

The above embodiments can also be expressed as a method as follows.

In this method of confirming the connection of the air-conditioner communication system, the connection is confirmed between the wireless LAN adapter 2 having a function as the network communication unit of the air conditioner 1 and the terminal device 4 communicable with the wireless LAN adapter 2 and having the display 4*d*. Then, the terminal device 4 accesses the wireless LAN adapter 2 and acquires the connection information from the wireless LAN adapter 2 whether the wireless LAN adapter 2 is communicable with the router 3 that is to configure the local area network. The terminal device 4 displays the acquired connection information on the display 4*d*.

In this method of confirming the connection of the air-conditioner communication system, the network connection status can be confirmed on the display 4*d* of the terminal device 4 without looking at the wireless LAN adapter 2. Thus, even in an installation environment where it is not easy to visually check the wireless LAN adapter 2, the network connection status can be easily confirmed on the display 4*d* of the terminal device 4.

The above embodiments can also be expressed as the wireless LAN adapter 2 as follows.

This wireless LAN adapter 2 has a function as the network communication unit of the air conditioner 1 and is communicable with the terminal device 4. Then, the wireless LAN adapter 2 includes the connection information acquisition unit 21 that acquires connection information as to whether the wireless LAN adapter 2 is communicable with the router 3 that is to configure the local area network, and the display image construction unit 22 that uses the connection information as display image data.

In this wireless LAN adapter 2, the network connection status can be confirmed by accessing the wireless LAN adapter 2 from the terminal device 4 and viewing and displaying the network connection status without looking at the wireless LAN adapter 2. Thus, even in an installation environment where it is not easy to visually check the wireless LAN adapter 2, the network connection status can be easily confirmed on the display 4d of the terminal device 4.

The above embodiments can also be expressed as instructions (including an application on a mobile phone) installed in the terminal device 4 as follows.

This connection confirmation instruction of the air-conditioner communication system is installed in the terminal device 4 that is communicable with the wireless LAN adapter 2 having a function as the network communication unit of the air conditioner 1 and has the display 4d. The connection confirmation instruction of the air-conditioner communication system allows the terminal device 4 to achieve:

(a) a function of accessing the wireless LAN adapter 2 and acquiring the connection information as to whether the wireless LAN adapter 2 is communicable with the router 3 that is to configure the local area network, and (b) a function of displaying the connection information on the display 4d.

In this connection confirmation instruction of the air-conditioner communication system, the network connection status can be confirmed on the display 4d of the terminal device 4 without looking at the wireless LAN adapter 2. Thus, even in an installation environment where it is not easy to visually check the wireless LAN adapter 2, the network connection status can be easily confirmed on the display 4d of the terminal device 4.

The above instructions can also be expressed as a recording medium (memory, hard disk, optical disk, magnetic disk, or the like) recording the instructions as follows.

This recording medium records the connection confirmation instructions of the air-conditioner communication system installed in the terminal device 4 that is communicable with the wireless LAN adapter 2 having a function as the network communication unit of the air conditioner 1 and has the display 4d. Then, the terminal device 4 executes the connection confirmation instructions to achieve:

(a) a function of accessing the wireless LAN adapter 2 and acquiring the connection information as to whether the wireless LAN adapter 2 is communicable with the router 3 that is to configure the local area network, and (b) a function of displaying the connection information on the display 4d.

<<Others>>

In the above embodiments, the wireless LAN adapter 2 is separately provided outside the air conditioner 1 and is connected by the harness 2h. However, the wireless LAN adapter 2 can be built in the air conditioner 1 itself.

Further, in the above embodiments, an example in which the server 6 is connected to the router 3 via the Internet 5 is shown. However, the terminal device 4 configured to substitute the display and operation functions of the wireless LAN adapter 2 is not limited to via the Internet, but can also be used on smaller scales, such as intranets.

While various embodiments have been described herein above, it is to be appreciated that various changes in form and detail may be made without departing from the spirit and scope presently or hereafter claimed.

Furthermore, although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: AIR CONDITIONER (INDOOR UNIT)
1d: DISPLAY
1r: REMOTE CONTROLLER
2: WIRELESS LAN ADAPTER
2a: POWER LAMP
2b: OPERATION BUTTON
2c: RESIN CASE
2d: INDICATOR LAMP
2h: HARNESS
3: ROUTER
4: TERMINAL DEVICE
4d: DISPLAY
4e: STORAGE UNIT
4k: KEYBOARD
4p: POINTING DEVICE
5: INTERNET
6: SERVER
7: CEILING
10: CONSUMER
21: CONNECTION INFORMATION ACQUISITION UNIT
22: DISPLAY IMAGE CONSTRUCTION UNIT
40: MESSAGE FIELD
41: UPDATE BUTTON
42: SELECTION PART
43: MANUAL SETTING BUTTON
44: SSID FIELD
45: PASSWORD FIELD
46: CONNECTION START BUTTON
47: DISCRIMINATION SWITCH
48: RESET SWITCH
49: OFF SWITCH
100: AIR CONDITIONER COMMUNICATION SYSTEM

The invention claimed is:

1. An air-conditioner communication system comprising:
a ceiling-embedded air conditioner;
a wireless local area network (LAN) adapter attached to the air conditioner and installed at a location where an indicator lamp of the wireless LAN adapter is hidden from view of a user and that functions as a network communication unit of the air conditioner;
a router that configures a LAN, wherein the wireless LAN adapter is connected to the LAN through the router;
a server that communicates with the router via a telecommunication line; and
a terminal device that communicates with the wireless LAN adapter and that comprises a display, wherein
the wireless LAN adapter:
  acquires connection information that indicates whether the wireless LAN adapter is in communication with the router; and
  provides the terminal device with the connection information, and
the terminal device indicates in one screen on the display, based on the connection information, whether the air conditioner, the wireless LAN adapter, the router, and the server are in communication with one other by using icons that respectively represent the air conditioner, the wireless LAN adapter, the router, and the server and that are aligned in an order of the air conditioner, the wireless LAN adapter, the router, and the server.

2. The air-conditioner communication system according to claim 1, wherein the terminal device receives an operation from the wireless LAN adapter and transmits an operation signal to the wireless LAN adapter.

3. The air-conditioner communication system according to claim 1, wherein the connection information is acquired periodically or through an update operation.

4. The air-conditioner communication system according to claim 1, wherein the wireless LAN adapter transmits, to the server, a response request signal requesting a response, and when the wireless LAN adapter receives the response, the terminal device indicates on the display that the wireless LAN adapter, the router, and the server are in communication with one another.

5. The air-conditioner communication system according to claim 1, wherein the terminal device initializes a connection between the wireless LAN adapter and the router and displays the initialization on a screen of the display.

6. The air-conditioner communication system according to claim 1, wherein a screen on the display showing the connection information also comprises settings for setting the connection between the wireless LAN adapter and the router.

7. A method of confirming a connection between a wireless local area network (LAN) adapter and a terminal device of an air-conditioner communication system included in a ceiling- type air conditioner, wherein the wireless LAN adapter functions as a network communication unit of the air conditioner and the terminal device includes a display, the method comprising:
    accessing the wireless LAN adapter from the terminal device, wherein the wireless LAN adapter is installed at a location where an indicator lamp of the wireless LAN adapter is hidden from view of a user;
    acquiring, from the wireless LAN adapter, connection information that indicates whether the wireless LAN adapter is in communication with a router that configures a LAN; and
    indicating in one screen on the display based on the connection information, whether the air conditioner, the wireless LAN adapter, the router, and a server are in communication with one another by using icons that respectively represent the air conditioner, the wireless LAN adapter, the router, and the server and that are aligned in an order of the air conditioner, the wireless LAN adapter, the router, and the server.

8. A wireless local area network (LAN) adapter that functions as a network communication unit of a ceiling-embedded air conditioner and that communicates with a terminal device, the wireless LAN adapter comprising:
    a central processing unit (CPU) that:
        acquires connection information indicating whether the wireless LAN adapter is in communication with a router that configures a LAN; and
        uses the connection information as display image data, wherein
        the display image data indicates whether the air conditioner, the wireless LAN adapter, the router, and a server are in communication with one another via a telecommunication line by using icons that respectively represent the air conditioner, the wireless LAN adapter, the router, and the server and that are aligned in an order of the air conditioner, the wireless LAN adapter, the router, and the server in one screen, wherein
    the wireless LAN adapter is installed at a location where an indicator lamp of the wireless LAN adapter is hidden from view of a user.

9. A non-transitory computer readable medium storing connection confirmation instructions for an air-conditioner communication system of a ceiling-embedded air conditioner including a terminal device that communicates with a wireless local area network (LAN) adapter that functions as a network communication unit of the air conditioner, wherein the connection confirmation instructions are installed in the terminal device and causes the terminal device to executes the steps of:
    accessing the wireless LAN adapter that is installed at a location where an indicator lamp of the wireless LAN adapter is hidden from view of a user and acquiring connection information that indicates whether the wireless LAN adapter is in communication with a router that configures a LAN; and
    indicating in one screen on a display of the terminal device based on the connection information, whether the air conditioner, the wireless LAN adapter, the router, and a server are in communication with one another via a telecommunication line by using icons that respectively represent the air conditioner, the wireless LAN adapter, the router, and the server and that are aligned in an order of the air conditioner, the wireless LAN adapter, the router, and the server.

* * * * *

UNITED STATES PATENT AND TRADEMARK OFFICE
CERTIFICATE OF CORRECTION

PATENT NO. : 11,313,576 B2  
APPLICATION NO. : 17/262604  
DATED : April 26, 2022  
INVENTOR(S) : Fukushima et al.

Page 1 of 1

It is certified that error appears in the above-identified patent and that said Letters Patent is hereby corrected as shown below:

In the Claims

At Column 13, Claim number 7, Line number 37, the word "display based" should read -- display, based --, At Column 14, Claim number 9, Line number 37, the word "device based" should read -- device, based --.

Signed and Sealed this  
Ninth Day of August, 2022

Katherine Kelly Vidal  
*Director of the United States Patent and Trademark Office*